Figure 1:
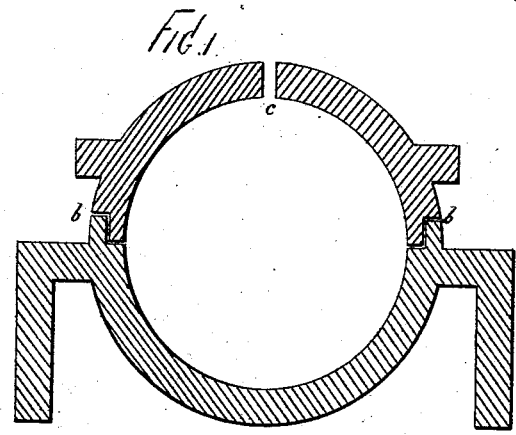

(No Model.)

S. F. SHELBOURNE.
MOLD FOR INSULATING SUBTERRANEAN ELECTRIC CABLES.

No. 275,423. Patented Apr. 10, 1883.

UNITED STATES PATENT OFFICE.

SIDNEY F. SHELBOURNE, OF NEW YORK, N. Y.

MOLD FOR INSULATING SUBTERRANEAN ELECTRIC CABLES.

SPECIFICATION forming part of Letters Patent No. 275,423, dated April 10, 1883.

Application filed January 12, 1883. (No model.)

*To all whom it may concern:*

Be it known that I, SIDNEY F. SHELBOURNE, a citizen of the United States, residing in the city of New York and State of New York, have invented certain new and useful improvements in molds for use in insulating wires from each other in underground electric cables and such cables from surrounding or earth conductors, in the adaptation of such cables to the purposes of telegraphic or telephonic transmission; and I do hereby declare that the following is a full, clear, and exact description of the invention, which will enable others skilled in the art to which it appertains to make and use the same.

Heretofore and up to the present time a large number of patents have been granted in the United States and European countries for inventions aiming to achieve the practicable and useful conduction of electricity under ground. All these inventions, so far as I am aware, have aimed at the objects desired to be attained in one of three methods. First, wires, each one covered or insulated by itself, have been assembled in bundles or cables and drawn into tubes or other conduits to contain them; second, wires, in some cases left bare or without insulation and in other cases each one insulated by itself, have been sustained on supports, hooks, or in notches within a trough or other conduit having some means for the drainage of water accumulating within it, but the said wires not being specially protected from the atmosphere or moisture; third, a number of wires separated from each other have been embedded in some insulating material or composition, as asphalt, rosin, or clay or sand combined with rosin or other insulating plastic fusible substance filling the box, trough, or other conduit containing the wires, the whole insulation adhering to the trough and the wires and preventing the free expansion and contraction of the latter.

The object of my invention is to provide the means of making the cable complete in itself and entirely independent of the trough or conduit to contain it—that is, the wires are insulated in mass, and thus protected from the atmosphere and moisture, and the insulation and wires together are bound with jute wrapping, so that, being slightly flexible and the whole mass capable of expansion and contraction with the wires, the cable merely rests in the trough or conduit, which contains it only as an extra protection of the wires and their insulation from injury. The particular means and method of producing such a cable are shown in the drawings and described in the specification of my application for a patent for a subterranean cable filed September 21, 1882, and my present application is for a patent for the means of insulating the cable described therein. In that application a skeleton cable is shown of wires built up from the center of the cable on annular rings or templets, the whole forming a round slightly-flexible construction of any desired length between the test or distributing boxes, but usually from four hundred to one thousand feet. The insulation in mass of the skeleton cable thus constituted is effected as follows, referring to the drawings herewith.

Figure 2:
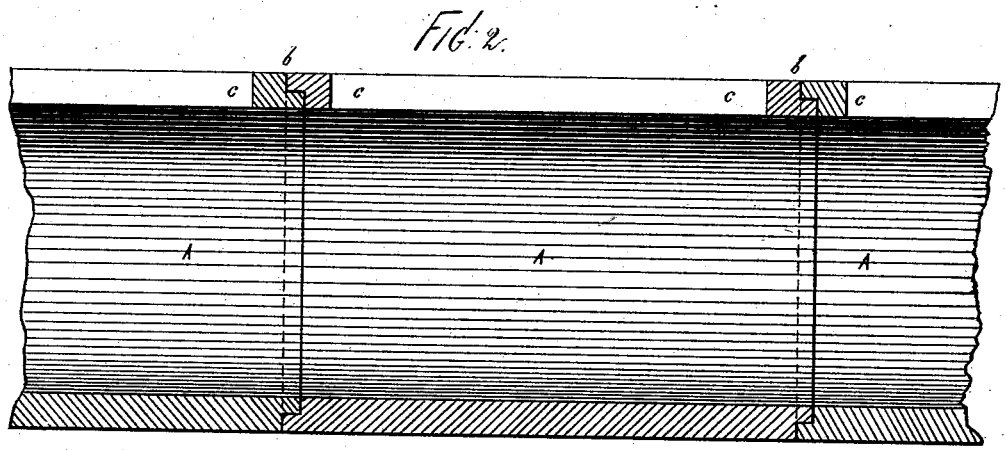
Figure 3:
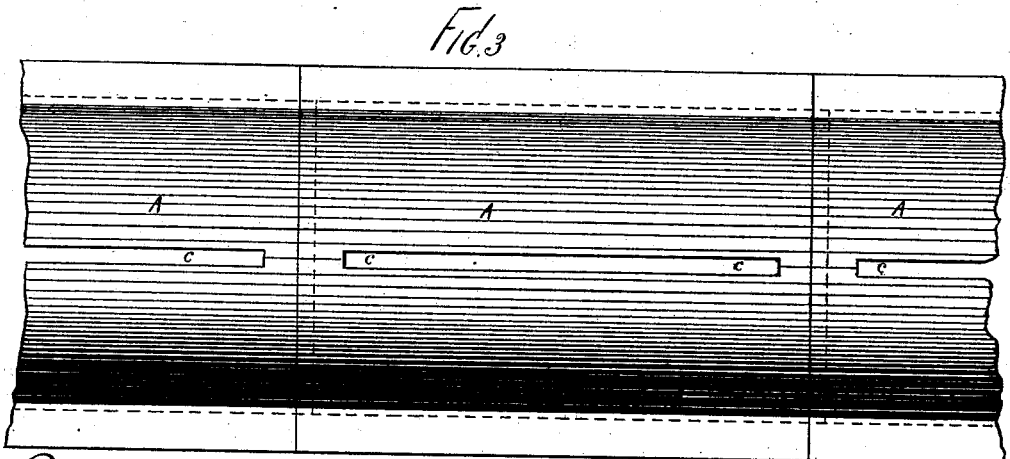
Figure 4:

I employ an indefinite length or series of sectional molds, of which Figure 1 represents a cross-section of one portion or division of the same. The right-angled dovetail longitudinal joints or divisions between the upper and lower half of the sections are shown at *b b* in this figure. In Fig. 2, which is a vertical longitudinal section, the same character of joints is shown at *b b*, connecting one length or member of the series of forms with the adjacent members, and which may be extended indefinitely in either direction. The slots forming the pour-holes for the melted insulating material are shown at *c c c c* in Fig. 3, which is a plan view of a limited portion of the sectional mold. The same letter represents these slots in Figs. 1 and 2. Fig. 4 represents a hook of adjustable length, by means of a sufficient number of which the skeleton cable is suspended centrally in the series of forms through the slots *c c c c*, the handle of the hook being adjusted to rest on the tops of the molds across the direction of the slots.

The particular method of accomplishing the insulation of the cable is as follows: The skeleton cable having been constructed in lengths as may be desired, it rests upon cross-strips of wood immediately over the trough or box to contain it. Being then slightly lifted from its position, the lower halves of the series of forms or molds are placed under it and locked together in their joints for any desirable length, as twenty to one hundred feet. The top or cover portions of the molds are then put on and joined in their places in succession; and in doing so the hooks shown in Fig. 4 are inserted through the slots c c c c, and, catching one or more of the wires of the cable, the handles of the hooks are adjusted to suspend the cable as desired. The distant ends of the mold-sections having been temporarily stopped with cotton, wool, or other suitable material, the melted insulating compound is then poured in along the several sections, so as to fill the mold and inclose the skeleton cable. When the insulation has become set by cooling the sections of the mold are removed and used in succession for other portions of the cable. The sections of the mold are kept chilled by ice up to the moment of use to cause the insulating material to set rapidly on the exterior of the cable, and also, together with the right-angled shapes of the joints of the sections, to prevent leakage while cooling. The insulating material is prevented from adhering to the interior surfaces of the sections of mold by a light application of glycerine before they are placed to inclose the skeleton cable.

I am aware that molds are in common use for various purposes in surrounding or molding one sort of material about another and inclosed material, and even in the case of melted glass for coating and insulating wires; but in all these cases the means employed and the objects sought to be accomplished have been in scope and effect different from those herein explained.

I claim, therefore, and desire to secure by Letters Patent of the United States—

1. A mold for insulating electric cables and trains of wires for underground telegraphy and similar uses, composed of sectional members made up of a series of semi-cylindrical forms held in place and in line with each other, both longitudinally and diametrically, by matching joints, and the said cylindrical parts forming, in pairs, the one the base and the other the cover of each section, and provided with extended slots as pouring-entrances for the insulating material, the whole in form and operation as herein described.

2. In combination with a series of forms composing a sectional mold for insulating electric cables for underground uses, an adjustable hook for suspending within the sections the skeleton cable or forms of wires to be insulated, substantially as described.

3. In the insulation of underground cables, an adjustable hook, as described, in connection with the running slots c c c c, extending nearly the whole length of the sections of the mold for the purpose of balancing the skeleton cable at numerous points within its prolonged inclosing mold-sections, as herein set forth.

In testimony of which I have hereunto subscribed my name in the presence of two witnesses.

SIDNEY F. SHELBOURNE.

Witnesses:
 GEO. L. WEED,
 H. P. BRUSH.